United States Patent [19]
Leveto

[11] Patent Number: 6,058,276
[45] Date of Patent: May 2, 2000

[54] USER INTERFACE FOR AN ELECTROSTATOGRAPHIC REPRODUCTION MACHINE

[75] Inventor: Mark L. Leveto, West Henrietta, N.Y.

[73] Assignee: Xerox Corporation, Stamford, Conn.

[21] Appl. No.: 08/970,319

[22] Filed: Nov. 14, 1997

[51] Int. Cl.[7] .................................................. G03G 15/00
[52] U.S. Cl. ............................................. 399/81; 345/34
[58] Field of Search ................................ 399/81; 345/34, 345/46

[56] References Cited

U.S. PATENT DOCUMENTS

| | | | |
|---|---|---|---|
| 4,014,013 | 3/1977 | McElroy | 345/46 X |
| 4,408,869 | 10/1983 | Tomosada et al. | 345/34 X |
| 4,491,827 | 1/1985 | Sugiura et al. | 345/46 X |
| 4,510,491 | 4/1985 | Prato | 345/34 X |
| 4,975,734 | 12/1990 | Mishimo | 399/81 X |

*Primary Examiner*—Fred L. Braun
*Attorney, Agent, or Firm*—Tallam I. Nguti

[57] ABSTRACT

An electrostatographic reproduction machine including a controller to time multiplex the function of displaying visual information and scanning user input devices. The machine includes an input device, to generate a signal responsive to a user input, a user interface, including visually displayed information, to visually display machine operating states determined as function of the signal, and a controller, including a selection line, coupled to the user interface and to the input device, to select the user interface to display the visually displayed information and to cause the input device to generate signals responsive to the user input.

5 Claims, 6 Drawing Sheets

FIG. 6

USER INTERFACE FOR AN ELECTROSTATOGRAPHIC REPRODUCTION MACHINE

RELATED APPLICATIONS

Cross reference is made to the following applications filed concurrently herewith: Attorney Docket Number D/97267 entitled "Pin Charge Corotron With Optimum Dimensions For Minimum Ozone Production" by Dhirendra C. Damji et al., Attorney Docket Number D/97268 entitled "Development Bias Connector With Integral Bearing Support" " by Dhirendra C. Damji et al., Attorney Docket Number D/97329 entitled "Charging Device Module For Use With Print Cartridge" by Ajay Kumar et al., Attorney Docket Number D/97329Q1 entitled "Charging Device Having An Electrode With Integral Electrical Connector" bay Ajay Kumar et al., Attorney Docket Number D/97329Q2 entitled "Charging Device Having A Shield With Integral Electrical Connector" by Ajay Kumar et al., Attorney Docket Number D/97330 entitled "Process Cartridge Including Process Components Having Critical Image Quality And Life-Extending Process Path Acting Regions" by Dhirendra C. Damji et al., Attorney Docket Number D/97331 entitled "Variable Size, Replaceable Toner Sump Pans For Print Cartridges" by Dhirendra C. Damji et al., Attorney Docket Number D/97332 entitled "Molded Quick Change Photoreceptor Support" by Ajay Kumar et al., Attorney Docket Number D/97333 entitled "Printing Cartridge With Planar Drive Train" by Ajay Kumar et al., Attorney Docket Number D/97334 entitled "Process Cartridge Including A Handle Defining Part Of A Machine Paper Path" by Dhirendra C. Damji et al., Attorney Docket Number D/97351 entitled "Electrostatographic Process Cartridge Having A Non-Metallic Photoreceptor Grounding Pin" by Daniel A. Chiesa et al., Attorney Docket Number D/97352 entitled "Limited Life Electrostatographic Process Cartridge Having A Waste Toner Electro-Sump Subassembly" by Daniel A. Chiesa et al., Attorney Docket Number D/97353 entitled "Process Cartridge Having A Drive Assembly Resultant Force Counter-Acting Member" by Dhirendra C. Damji et al., Attorney Docket Number D/97354 entitled "Process Cartridge Including A Banding Defect Preventing Waste Toner Moving Auger" by Dhirendra C. Damji et al., Attorney Docket Number D/97355 entitled "Process Cartridge Including A Developer Housing Defining Part Of A Machine Paper Path" by Dhirendra C. Damji et al., Attorney Docket Number D/97357 entitled "All-In-One Process Cartridge Including A Photoreceptor And Process Components Having Relative Critical Image Quality Acting Regions" by Dhirendra C. Damji et al., and Attorney Docket Number D/97478 entitled "Printing Cartridge With Molded Cantilever Developer Roller Spacing Spring" by Ajay Kumar et al.

BACKGROUND OF THE INVENTION

This invention relates to electrostatographic reproduction machines, and more particularly to a compact electrostatographic reproduction machine lacking a separate machine frame to which components are mounted, but which comprises separately framed, mutually aligning modules for enabling high level sourcing and quick non-specialized tools assembly and disassembly of the machine.

Generally, the process of electrostatographic reproduction includes charging a photoconductive member to a substantially uniform potential so as to sensitize the surface thereof. A charged portion of the photoconductive surface is exposed at an exposure station to a light image of an original document being reproduced. Typically, hard copy jobs, each comprising of a set of sheets of original documents are held and automatically handled by a recirculating document handler to the exposure station. Document handlers used with electrostatographic reproduction machines frequently are provided with a recirculating mode whereby stacked documents are withdrawn individually and sequentially from an input holding tray, passed to the exposure station, and then are outputted back to the holding tray for subsequent recirculation in the previous manner. Some document handlers also invert the documents so that a duplex document may be imaged on both sides.

Exposing a document sheet fed for example by a document handler to the exposure station records an electrostatic latent image onto the photoconductive member. After the electrostatic latent image is recorded as such, the latent image is subsequently developed using a development apparatus by bringing a charged dry or liquid developer material into contact with the latent image. Two component and single component developer materials are commonly used. A typical two-component dry developer material has magnetic carrier granules with fusible toner particles adhering triboelectrically thereto. A single component dry developer material typically comprising toner particles only can also be used. The toner image formed by such development is subsequently transferred to a copy sheet, on which it is then heated and permanently fused in order to form a "hardcopy" of the original image.

Electrostatographic reproduction machines based on this process, whether digital or light lens, are now commonly used in business environments, and the trend is more and more towards their use as desktop or personal reproduction machines or copiers. Conventionally, such digital and light lens electrostatographic reproduction machines contain selective electrostatographic components or susbsystems that are designed for mounting to a unitary machine frame in order to assure rigidity and subsystem to subsystem alignment. Typically, such a machine and its unitary frame is produced and integrated by one producer, even if some of its subsystems are produced by others for such subsequent integration. Invariably, some of the most each subsystem is likely to be lost when mounting, aligning and integration is carried out by another. It is therefore difficult to optimize the technical and operational quality, the total cost and the machine delivery time for such machines.

There is therefore a need for a compact electrostatographic reproduction machine that is comprised of separately framed modules that are each designed and supplied as self-standing, specable (i.e. separately specified with interface inputs and outputs), testable, and shippable module units, and that is specifically partitioned for enabling operative integration of all the critical electrostatographic functions, upon mere assembly without resort to subsequent alignment and adjustments. Advantageously, each such self-standing, specable, testable, and shippable module unit specifically allows for high level sourcing of the units to a small set of module-specific skilled production suppliers, thus optimizing the technical and operative quality, the total cost, and the time of delivering of the final product, the machine.

SUMMARY OF THE INVENTION

In accordance with the present invention, there is provided an electrostatographic reproduction machine including an input device, to generate a signal responsive to a user input, a user interface, including visually displayed information, to visually display machine operating states determined as function of the signal; and a controller, including a selection line, coupled to the user interface and to the input device, to select the user interface to display the visually displayed information and to cause the input device to generate signals responsive to the user input.

BRIEF DESCRIPTION OF THE DRAWINGS

In the detailed description of the invention presented below, reference is made to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
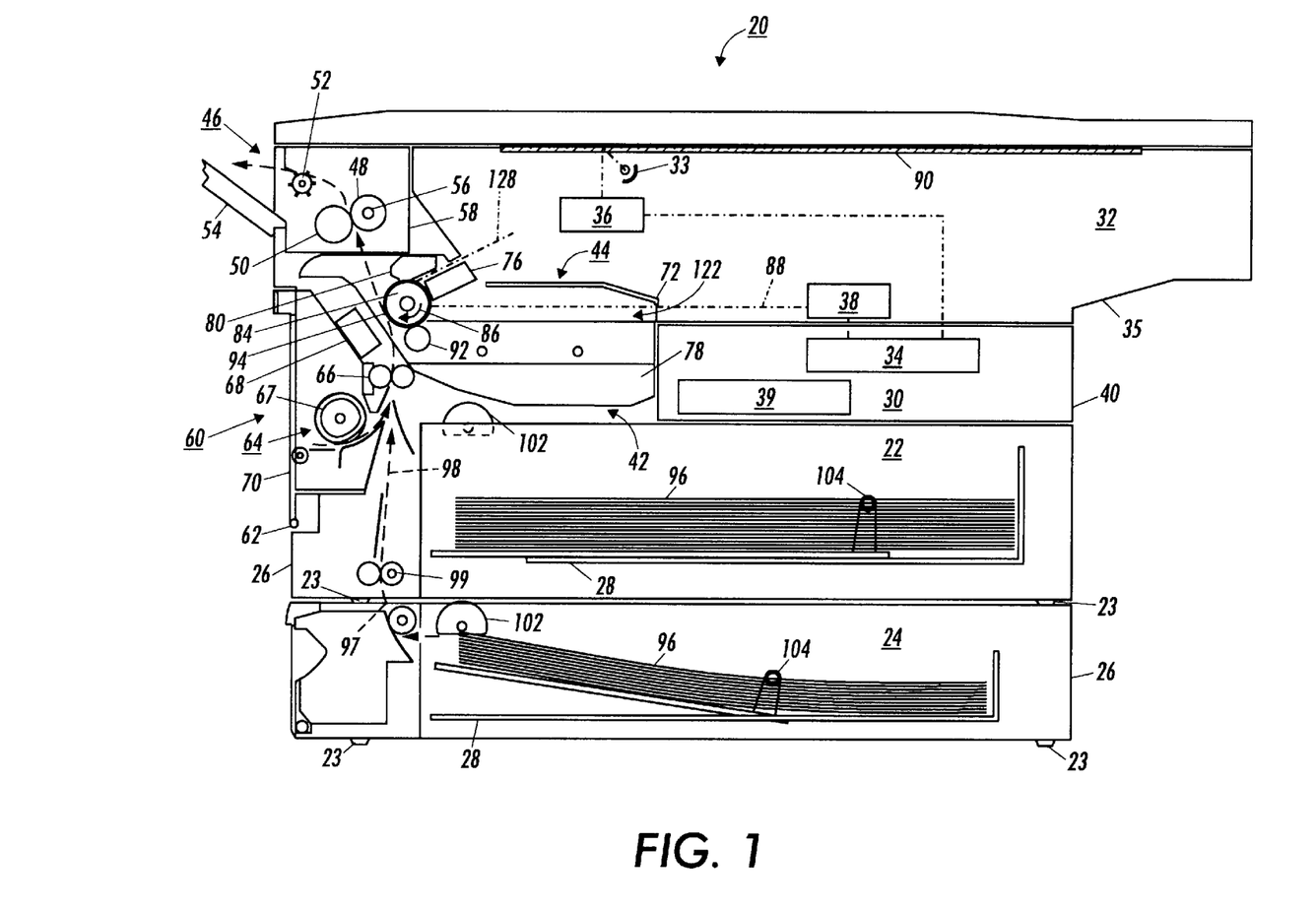
FIG. 1 is a front vertical illustration of an exemplary frameless compact electrostatographic reproduction machine comprising separately framed mutually aligning modules in accordance with the present invention.
Figure 2:
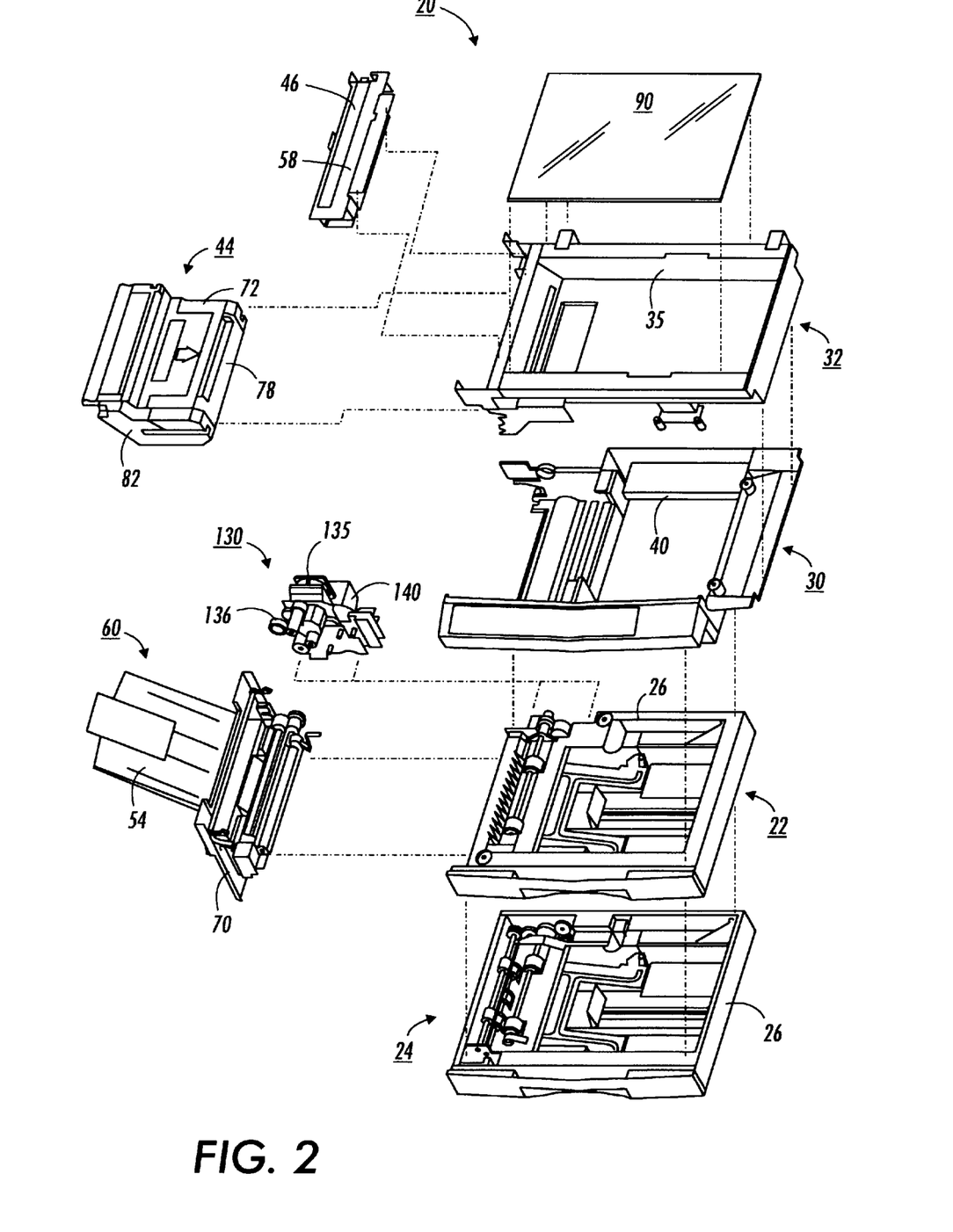
FIG. 2 is an exploded view of the separately framed and mutually aligning modules comprising the machine of FIG. 1.

Referring now to FIGS. 1 and 2, there is illustrated a frameless exemplary compact electrostatographic reproduction machine 20 comprising separately framed mutually aligning modules according to the present invention. The compact machine 20 is frameless, meaning that it does not have a separate machine frame to which electrostatographic process subsystems are assembled, aligned to the frame, and then aligned relative to one another as is typically the case in conventional machines. Instead, the architecture of the compact machine 20 is comprised of a number of individually framed, and mutually aligning machine modules that variously include prealigned electrostatographic active process subsystems.

As shown, the frameless machine 20 comprises at least a framed copy sheet input module (CIM) 22. Preferably, the machine 20 comprises a pair of copy sheet input modules, a main or primary module the CIM 22, and an auxiliary module the (ACIM) 24, each of which has a set of legs 23 that cam support the machine 20 on a surface, therefore suitably enabling each CIM 22, 24 to form a base of the machine 20. As also shown, each copy sheet input module (CIM, ACIM) includes a module frame 26 and a copy sheet stacking and lifting cassette tray assembly 28 that is slidably movable in and out relative to the module frame 26, in order to enable its reloading with sheets of the paper. When as preferred here, the machine 20 includes two copy sheet input modules, the very base module is considered the auxiliary module (the ACIM), and the top module which mounts and mutually aligns against the base module is considered the primary module (the CIM).

More specifically, the sheet stacking and lifting cassette tray assembly 28 includes a D-shaped feedhead roller 102, and an adjustable sheet dimension guide member 104 for holding a stack of sheets 96 in alignment. In accordance with the present invention, the module frame 26 includes an outer cover, and thus serves as a base of the machine 20. The CIM 22 also includes drive coupling components, electrical connectors (not shown) for connecting to the ECS/PS module 30. As further shown, the ACIM 24 further comprises sheet an extension portion 97 including sheet advancing rollers 99 for advancing sheets fed from the ACIM to the common set of registration rollers 66, which then supply registered sheets from the CIM and ACIM to an image transfer point 94 on the photoreceptor or drum 84.

The main and auxiliary copy input sheet modules 22, 24 and the associated paper path extension 97 advantageously allows a "load-while-running" ability, meaning that an operator is able to load paper into one of them, while a job is running with paper being fed out of the other. Each copy sheet input module 22, 24 has a D-shaped forward buckle feedhead roller 102 energized via a solenoid (not shown) that is activated by a single revolution clutch (not shown), and is driven by the drives module 130. Each revolution of the D-shaped feedhead roller 102 corresponds to one sheet of paper being fed.

The machine 20 next comprises a framed electronic control and power supply (ECS/PS) module 30 in accordance with the present invention (to be described in detail below). As shown, the ECS/PS module mounts onto, and is mutually aligned against the CIM 22 (which preferably is the top or only copy sheet input module). The ECS/PS module 30 includes all controls and power supplies (to be described below) for all the modules and processes of the machine 20. It also includes an image processing pipeline unit (IPP) 34 for managing and processing raw digitized images from a Raster Input Scanner (RIS) 36, and generating processed digitized images for a Raster Output Scanner (ROS) 38. Importantly, the ECS/PS module 30 includes a module frame 40 to which the active components of the module as above are mounted, and which forms a covered portion of the machine 20, as well as locates, mutually aligns, and mounts to adjacent framed modules, such as the CIM 22 and the imager module 32.

The machine 20 also comprises the separately framed imager module 32, which mounts over, and mutually aligns against the ECS/PS module 30. As shown, the RIS 36, the ROS 38, a light source 33, and an imager module frame 35 comprise the imager module 32. The RIS 36 preferably is a full rate/half rate scanner with imaging optics and a CCD array (not shown separately), for converting hard copy images to electronic bit maps or digitized images. The imager module 32 includes electrical connection means (not shown) connecting the RIS 36 to an image processing unit (IPP) 34 for processing the digitized images. The imager module 32 has a platen 90 and a top cover 91 (FIG. 2) In accordance with the present invention, the imager module frame 35 (to which the RIS 36 and ROS 38 are assembled), forms a covered portion of the machine 20 upon assembly, as well as locates to, mutually aligns with, and mounts to the ECS/PS module 30, and the other adjoining modules.

The framed copy sheet input modules 22, 24, the ECS/PS module 30, and the imager module 32, as mounted above, define a cavity 42. The machine 20 importantly includes a customer replaceable, all-in-one CRU or process cartridge module 44 that is insertably and removably mounted within the cavity 42, and in which it is mutually aligned with, and operatively connected to, the framed CIM, ECS/PS and imager modules 22, 30, 32. The CRU or process cartridge module 44 generally comprises a module housing subassembly 72, a photoreceptor 84 rotatable in the direction of the arrow 86, a charging subassembly 76, a developer subassembly 78 including a developer roll 92, a cleaning subassembly 80 for removing residual toner as waste toner from a surface of the photoreceptor, and a waste toner sump subassembly 82 (FIG. 2) for storing waste toner. The module housing subassembly 72 of the CRU or process cartridge module 44 importantly includes a first path 122 for receiving a ROS beam 88 onto the photoreceptor 84, and a second path for receiving an erase light 128 onto the photoreceptor.

As further shown, the machine 20 includes a framed fuser module 46, that is mounted above the process cartridge module 44, as well as adjacent an end of the imager module 32. The fuser module 46 comprises a pair of fuser rolls 48, 50, and at least an exit roll 52 for moving an image carrying sheet through, and out of, the fuser module 46 into an output or exit tray 54. The fuser module also includes a heater lamp 56, temperature sensing means (not shown), paper path handling baffles(not shown), and a module frame 58 to which the active components of the module, as above, are mounted, and which forms a covered portion of the machine 20, as well as locates, mutually aligns, and mounts to adjacent framed modules, such as the imager module 32 and the process cartridge module 44.

As shown in FIG. 2, the machine 20 includes a separately framed drive module 130 that comprises a main drive motor 132 which is a Brushless DC motor, motor control board and interconnect boards (not shown), and a NOHAD (Noise, Ozone, Heat and Dust) fan assembly (not shown). It also includes a train 136 of all of the primary gears for transmitting mechanical power to various framed modules requiring drive, such as the process cartridge module 44, the door module 60, the CIM 22, and the fuser module 46. The drive module 130 also includes a machine cooling fan assembly (not shown). Importantly too, the drive module includes a module frame 140, which is a sheet metal frame, and to which the active components of the module as above are mounted. The module frame 140 forms a covered portion of the machine 20, locates to, mutually aligns with, and mounts to adjacent framed modules, such as the CIM 22, the imager module 32, the ECS/PS module 30, and the fuser module 46.

Figure 3:
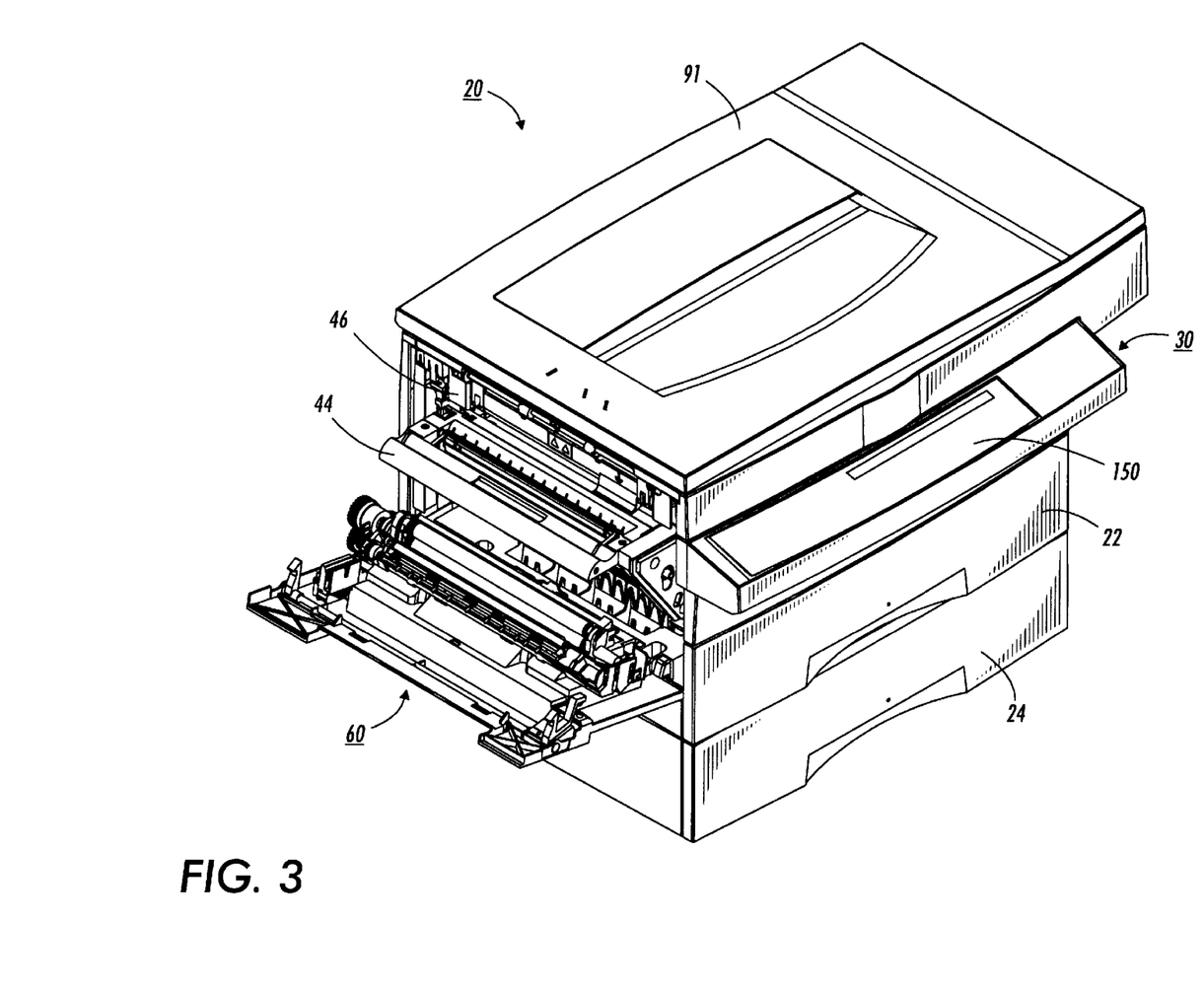
FIG. 3 is a vertical perspective view of the machine of FIG. 1 showing its User Interface portion of the Electronic Control and Power module, and its separately framed door module in the open position.

Referring now to FIGS. 1–3, the machine 20 then includes an active component framed door module 60, which is mounted pivotably at pivot point 62 to an end of the CIM 22. The door module 60 as mounted, is pivotable from a substantially closed vertical position into an open near-horizontal position (FIG. 3) in order to provide access to the process cartridge module 44, as well as for jam clearance of jammed sheets being fed from the CIM 22. The Door module 60 comprises active components including a bypass feeder assembly 64, sheet registration rolls 66, toner image transfer and detack devices 68, and the fused image output or exit tray 54. The door module 60 also includes drive coupling components and electrical connectors (not shown), and importantly, a module frame 70 to which the active components of the module as above are mounted, and which forms a covered portion of the machine 20, as well as, locates, mutually aligns, and mounts to adjacent framed modules, such as the CIM 22, the process cartridge module 44, and the fuser module 46. As further shown, the door module 60 is mounted pivotably to the CIM 22 at a pivot 62, such that it is openable for providing access to a portion of the copy paper path 98 (jam clearance) and to the process cartridge module 44 (cartridge removal and replacement).

Referring in particular to FIG. 3, the ECS/PS module 30, including a User Interface (UI) 150, is shown in greater detail. As shown, it includes the image processing pipeline unit (IPP) 34 for managing and processing raw digitized images from the RIS 36 (FIG. 1), and generating processed digitized images for the ROS 38. The ECS/PS module 30 also includes the UI 150. The ECS/PS module 32 as such is a framed, self-contained module that includes the UI 150, and the complete electrical distribution and electronic control systems of all the nodules of the machine 20. It effectively packages and mounts all of the machine controls, image processing, power supplies, power and logic distribution, as well as the UI together within the ECS/PS module frame 40. It does so in a manner such that it can be fully specified separately for intended integration or assembly with the other modules, thus enabling it to be designed and manufactured by a separate supplier. The benefits of this, framed, self-contained electronic control and power system (ECS/PS) module include reduced product cost, elimination of loose components, improved system reliability, and ease of assembly.

The Power Supply function of the ECS/PS module 32 provides all the power required to run the machine 20. It utilizes a global AC input voltage and creates DC voltages required to operate the drives motor 132, and the imager module 32. It also provides a high voltage for charging the photoreceptor 84, as well as, for the developer subassembly 78 (FIG. 1), and for the image transfer/detack device 68. It also supplies power for the fuser module 46, the exposure lamp 33 of the imager module, as well as for logic voltage requirements. For control purposes, the ECS/PS module provides control for all the machine or copier processes, monitors all of the various sensors located within the machine, and communicates with an operator through the UI 150. The imaging pipeline ASIC or IPP 34, and an imager/ROS interface (not shown) reside in a machine processes or copier controller block.

The UI board 150 is a standalone intelligent (i.e. containing a small microprocessor) printed circuit board which communicates switch information to the ECS module 30. A protocol on a serial interface between the UI 150 and a logic controller board facilitates communications and interrupt capability. The ECS module 30 also communicates system status and diagnostic information back to the UI 150. As shown, the UI 150 includes up/down keys, each of which activates a mechanical switch that is debounced by a scanning microprocessor. The logic controller board comprises a set of circuits that are attached or mounted directly to the power supply board. Power and communications occur through a stacking connector (not shown) without use of any additional wires or harnesses.

More specifically, the machine 20 is a desktop digital copier, and each of the modules 22, 24, 30, 32, 44, 48, 60, is a high level assembly comprising a self-containing frame and active electrostatographic process components specified for sourcing, and enabled as a complete and shippable product. It is believed that some existing digital and light lens reproduction machines may contain selective electrostatographic modules that are partitioned for mounting to a machine frame, and in such a manner that they could be designed and manufactured by a supplier. However, there are no known such machines that have no separate machine frame but are comprised of framed modules that are each designed and supplied as self-standing, specable (i.e. separately specified with interface inputs and outputs), testable, and shippable module units, and that are specifically crafted and partitioned for enabling all of the critical electrostatographic functions upon a simple assembly. A unique advantage of the machine 20 of the present invention as such is that its self-standing, specable, testable, and shippable module units specifically allow for high level sourcing to a small set of module-specific skilled production suppliers. Such high level sourcing greatly optimizes the quality, the total cost, and the time of delivering of the final product, the machine 20.

Successful vertical and final integration or assembly of the compact machine 20 starts with the Copy Input Modules, namely the CIM 22, and the ACIM 24. The ACIM 24 has a tray capacity of 250 sheets, and the main copy sheet input module preferably has a tray capacity of 500 sheets. Each however can handle a minimum sheet size of 8.5"×5.5", and maximum sheet size of 8.5"×14". Each can also handle sheet or paper weights within a range of 15 to 24 pound. The paper or sheet stacking and supporting tray assembly 28 of each sheet input module 22, 24, is slidable in and out relative to its integrated plastic molded frame 26, and is thus customer removable from the front of the machine 20 as assembled for reloading with sheets.

A paper or sheet when fed from the CIM 22, or the ACM 24, travels first to the set of registration rolls 66, where a sensor (not shown) detects the leading edge thereof. Detection of the leading edge of the sheet acts as a signal to the machine control logic (ESS) 39 to initiate document scanning. The registration rolls 66 then drive the paper or sheet through the transfer point 94 up to the fuser module 46 for fusing. The machine 20 is a center registered machine, meaning that the copy sheets are centered Inboard-to-Outboard in the paper path 98 of the machine. Such sheet registration is provided by the set of registration rollers 66, which form a stalled roll system, and comprise a soft high friction elastomer roll and a low friction hard steel roll that are coupled together with bearings, and are spring loaded. A wrap spring clutch (not shown) is attached to the driven shaft (not shown) of the elastomer roll.

Referring in particular to FIGS. 2 and 3, when the main or the main and auxiliary copy sheet input modules 22, 24, are set up and form a base to the compact machine 20, the door module 60 is then mounted pivotably to the pivot 62, on the CIM 22 to a left hand side thereof (relative to an operator facing the front side of the machine represented by the slidable paper trays 28 of the copy sheet input modules). The door module 60 is mounted as such so that it swings out and down from a closed position, as well as up and in to the closed and latched position (FIG. 3). When swung out and down into an open position, the door module provides access to a portion of the paper path 98 for jam clearance, as well as, access to the all-in-one CRU or process cartridge module 44. The arc (not marked) through which the door module travels is preferably limited to 80 degrees by a tether (not shown) attached to an adjacent module of the machine.

With particular reference to FIG. 1, operation of an imaging cycle of the machine 20 using the all-in-one process cartridge module 44 generally, can be briefly described as follows. Initially, a photoreceptor in the form of a photoconductive drum 84 of the customer replaceable unit (CRU) or process cartridge module 44, rotating in the direction of the arrow 86, is charged by the charging subassembly 76. The charged portion of the drum is then transported to an imaging/exposing light 88 from the ROS 38 which forms a latent image on the drum 84, corresponding to an image of a document positioned on a platen 90, via the imager module 32. It will also be understood that the imager module 32 can easily be changed from a digital scanning module to a light lens imaging module.

The portion of the drum 84 bearing a latent image is then rotated to the developer subassembly 78 where the latent image is developed with developer material such as with charged single component magnetic toner using a magnetic developer roller 92 of the process cartridge module 44. The developed image on the drum 84 is then rotated to a near vertical transfer point 94 where the toner image is transferred to a copy sheet substrate 96 fed from the CIM 22 or ACIM 22 along a copy sheet or substrate path 98. In this case, the detack device 68 of the door module 60 is provided for charging the back of the copy sheet substrate (not shown) at the transfer point 94, in order to attract the charged toner image from the photoconductive drum 84 onto the copy sheet substrate.

The copy sheet substrate with the transferred toner image thereon, is then directed to the fuser module 46, where the heated fuser roll 48 and pressure roll 50 rotatably cooperate to heat, fuse and fix the toner image onto the copy sheet substrate. The copy sheet substrate then, as is well known, may be selectively transported to the output tray 54 or to another post-fusing operation.

The portion of the drum 84 from which the developed toner image was transferred is then advanced to the cleaning subassembly 80 where residual toner and residual charge on the drum 84 are removed therefrom. The imaging cycle of the machine 20 using the drum 84 can then be repeated for forming and transferring another toner image as the cleaned portion again comes under the charging subassembly 76.

Figure 4:
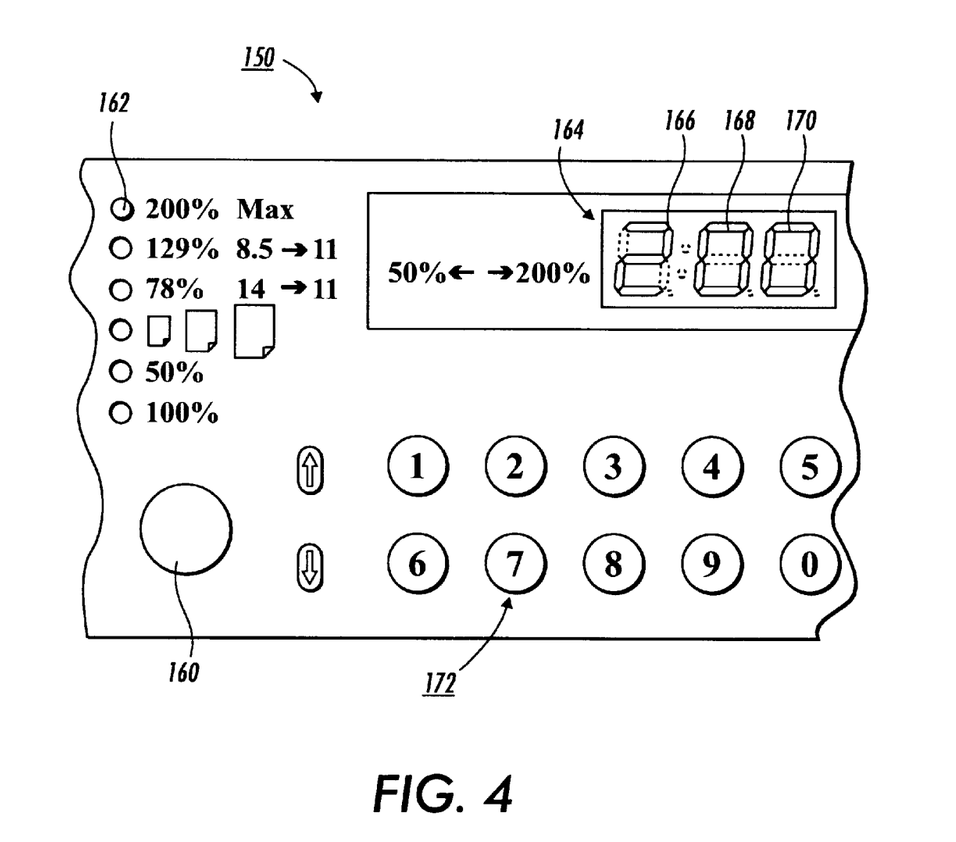
FIG. 4 is a partial schematic view of a user interface.

Referring now to FIG. 4, a portion of the user interface 150 is illustrated. The user interface 150 includes a plurality of user accessible selectors or key pad buttons. For instance, to select a reduction/enlargement size of a document, a user, with a toggle button 160, selects from one of a number of enlargement/reduction sizes. These sizes include from 50% to 200% wherein the toggle button 160 when depressed toggles to the selected size. The selected size is visually indicated by an illumination device such as an LED 162 associated with the selection of a 200% enlargement. Other sizes include illumination devices as well In addition to the illumination device associated with the selected size of the enlargement or reduction, a three digit display 164 is included. The three digit display 164 includes a first seven segment display 166, a second seven segment display 168 and a third seven segment display 170. Each of these displays includes seven light emitting diode segments such that the appropriate segments are illuminated to designate the selected percentages. For instance, if the selected reduction size is 50%, the first display 166 would not be illuminated but the second display 168 and the third display 170 would be illuminated such that the numerals 50 are displayed to the user. The user interface 150 further includes a plurality of input buttons 172 numbered from 0 to 9. Such buttons are typically used to select the number of copies, the number being displayed on the display 164, but also can be used in some instances to set the enlargement/reduction size.

While the user interface 150 includes visually displayed information to indicate various machine operating states such as the copy size as well as the number of copies selected, the selection of the desired operating conditions by the user through push button selections must be accurately displayed by the display 164 in a timely fashion. Of course, while accurate and timely display of information is highly desirable, there is a trade off between the cost of such a system versus a user's desire to generate printed output at a reasonable price. Consequently there is it dynamic tension between the desire for accurate and timely display of information versus the desire for products which are cost reduced.

Figure 5:
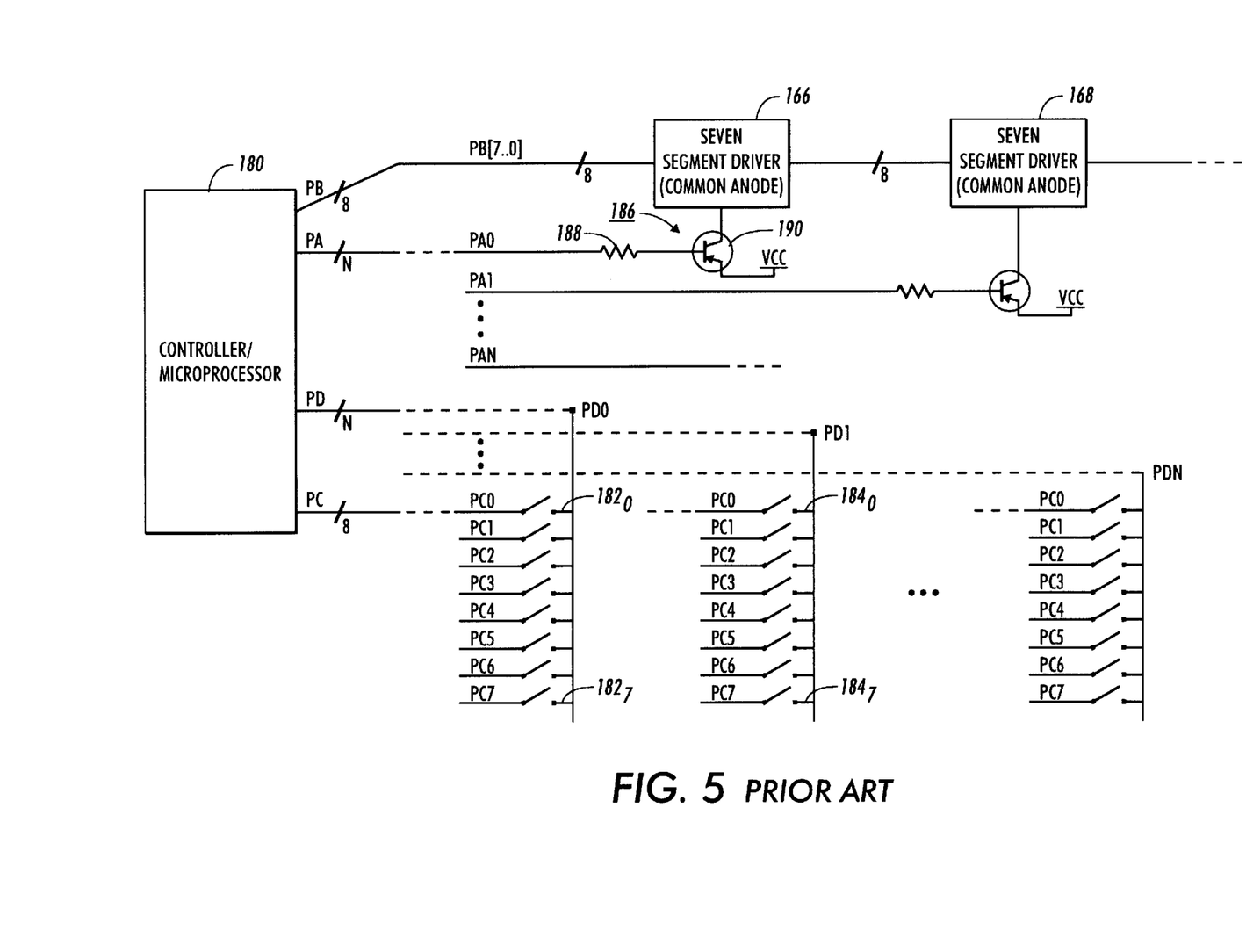
FIG. 5 is a schematic diagram of a prior art circuit for reading user input devices and displaying visual information.

FIG. 5 illustrates one known prior art apparatus for generating visually displayed information on display devices which are responsive to a user's selection. As illustrated in FIG. 5, a controller or microprocessor 180 is utilized to read user inputs through the selection of the buttons as well as to drive the seven segments of each of the display digits. The controller/microprocessor 180 is designed with a plurality of sets of inputs and a plurality of sets of outputs to control an output device, for instance, the seven segment driver LED's. As illustrated in FIG. 5, a matrix of switches serve as inputs to the controller/microprocessor over a parallel eight bit line, PC. These input lines are labeled as PC0 up to and including PC7 where each of the lines is coupled to a corresponding switch of a switch bank 182. A single switch is coupled to each of the PC lines such that seven switches $182_0$ through $182_7$ are each individually coupled to each of the PC lines. A second switch bank, including switches $184_0$ through $184_7$ are included. Additional rows of switch banks are available and can be accommodated under the illustrated scheme. These matrices of switch are selected by a user through the selection of one of the user interface selectors. For instance, the button 160 might correspond to the switch $182_0$ and the button labeled as a one for the buttons 172 might correspond to the switch $184_0$. When the user selects a button 160, the microprocessor identifies the selected button through generated signals which are transmitted to the microprocessor through the lines $PC_0$ through $PC_7$ where 10 Kohm pull up resistors are internal to the microprocessor 180. The microprocessor determines whether or not the button 160 has been selected by scanning through each of the switch banks through output lines PD0 through PDN. The microprocessor continually scans each of the PD lines sequentially pulling each of the PD lines low such that when the PD0 line, for instance, is pulled low then any information that has been selected through the user interface button 160 is transmitted through the PC lines to the microprocessor 180. Consequently, for each button or user selector, not only does the microprocessor require the eight line inputs of PC but additional N lines of PD are also necessary.

Once a particular button has been selected by the user, the signals generated by the button selection are transmitted to the microprocessor where the microprocessor identifies the generated signals through known processing techniques and generates a series of signals responsive thereto to light the appropriate segments on the seven segment displays. For instance, if the internal switch $182_0$ is selected by depression of the button 160, for instance, to select the 200% enlargement, eight signals would be generated by the controller 180. These generated signals are transmitted through a plurality of PB lines (eight lines) each of which is coupled to a seven segment display. As can be seen, however, each of the seven segment drivers is coupled to the same PB lines. Consequently, to select the proper seven segment driver for display of the information, additional output lines PA of the microprocessor 180 are coupled to an associated drive circuit 186 including a resistor 188 coupled to a PNP transistor 190 having a voltage supplied by a voltage supply, VCC. Other drive circuits are possible depending on the type of display devices being used. It is therefore necessary that the microprocessor scan through each of the PA lines at a predetermined rate such that the three seven segment drivers of the display 164 appear to remain lit at all times to a user. This technique requires a refresh rate which is sufficiently fast so that the segments of the displays appear lit.

While the described prior art technique and apparatus, of FIG. 5, for receiving user inputs and displaying visual information on a user output device provide for an accurate and responsive system for a user, such an apparatus increases the pin counts of the microprocessor which in turn increases the cost of the design. While other techniques are known such as to daisy chain all the inputs and the outputs to reduce the pin count of a microprocessor, this technique reduces the cycle of scanning the switches and the displays. This technique, is however, not desirable since the output illumination of the seven segment drivers can be reduced and certain switches can be either missed or misread.

Figure 6:
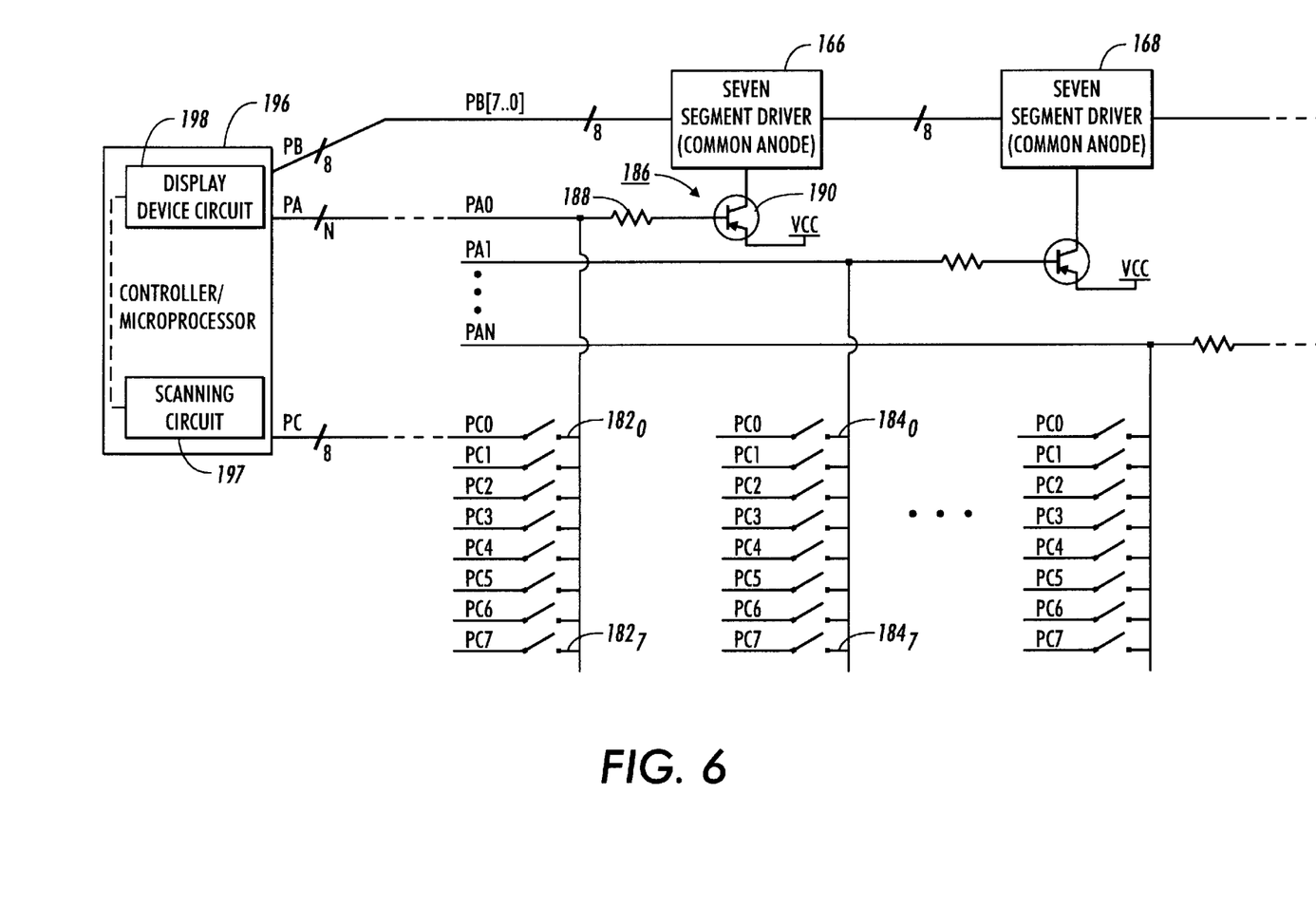
FIG. 6 is a schematic diagram of the present invention for reading user input devices and displaying visual information responsive thereto.

FIG. 6 illustrates the present invention which not only reduces the pin count of the microprocessor, thereby lowering the cost of the overall design, but also allows for a sufficiently high duty cycle such that the apparent performance of the overall system is not reduced. The present invention time multiplexes the functions of displaying and scanning, such that while the seven segment displays are being selected by a single output pin, the same output pin is used to prime one of the switch banks. In this fashion, an output display device, such as the seven segment driver, is primed simultaneously with the priming of one of the switch banks. This inventive procedure and apparatus therefore allows for a single operation, i.e., the generation of a signal at an output line, to perform two functions simultaneously.

As illustrated in FIG. 6, a controller/microprocessor 196 is connected to a plurality of display devices including the seven segment driver 166 and the seven segment driver 168. As before, the output lines PB, numbering eight, are coupled to the seven segment drivers for driving the segments thereof. The number of PB lines need not be eight, as the number is determined by the display devices being used. Likewise, the number of PC lines can be any number depending on the number of switches. The microprocessor 196 is also coupled to the previously described input switches $182_0$ to $182_7$ and $184_0$ to $184_7$. For the invention of FIG. 6, however, the output lines PD are no longer necessary and consequently the microprocessor 196 not only has a reduced pin count or port reduction but also has a reduced cost. The output lines PA include a plurality of output lines determined as a function of the number of seven segment drivers.

Each of the output lines PA are, however, coupled as well to an associated bank of switches such that the microprocessor simultaneously primes a seven segment driver and also primes a bank of switches through selection by a scanning circuit 197. The scanning circuit 197 scans each of the PA lines sequentially at a predetermined rate to determine which of the switch banks are being selected by a user. For instance, when PA0 is driven low, the seven segment driver 166 is selected for illumination and the switch bank 182 is also selected. In addition, a display device circuit 198, incorporated in the controller, drives the proper segments of the seven segment driver simultaneously with the PA0 line. When the PA1 line is driven low by the controller 196, the signals being transmitted over the PB lines are changed accordingly to reflect the necessary signal information to illuminate the display 168. The scanning circuit 197 is coupled to the display circuit 198 to cause the display circuit to change the signals transmitted over the PB lines as necessary.

While the scanning circuit 197 and the display device circuit 198 have been identified as part of the controller 196, the circuits 197 and 198 can be separate from the controller. In addition, the described circuits can be embodied as hardware, software, or firmware. It is well known and commonplace to program and execute imaging, printing, document, and/or paper handling control functions and logic with software instructions for conventional or general purpose microprocessors. This is taught by various prior patents and commercial products. Such programming or software may of course vary depending on the particular functions, software type, and microprocessor or other computer system utilized, but will be available to, or readily programmable without undue experimentation from, functional descriptions, such as those provided herein, or prior knowledge of functions which are conventional, together with general knowledge in the software and computer arts. That can include object oriented software development environments, such as C++. Alternatively, the disclosed system or method may be implemented partially or fully in hardware, using standard logic circuits or a single chip using VLSI design.

The seven segment drivers are disassociated from the banks of switches since the seven segment drivers are turned on with originals transmitted through the PB output lines of the microprocessor. While the prior art could prime the seven segment drivers at a rate different than the rate of selection of the switch banks, the present method allows for priming and selecting at the same rate. This feature of the present invention, however, does not negatively impact either the selection of an input by the depression of a user button or the output of the visually displayed information. It has been found for instance that a duty cycle of 1 millisecond (a scanning rate of one kilohertz) is appropriate in the present invention such that, if there are eight banks of switches, eight milliseconds would be required to scan through each of the banks. This is still significantly faster than the rate at which a user might input information by the keyboard buttons. Likewise, such a refresh rate, while relatively slow in computer terms, is sufficiently fast to maintain a proper illumination of the seven segment drivers such that a user does not notice any flicker or drop out of the visually displayed information. The seven segment drivers include a predetermined refresh rate necessary to display visual information without apparent visual flicker or dropout.

The present invention is applicable to any number and type of display devices including seven segment drivers, LED's, etc., and any number of switch banks up to a reasonable number which, for instance, might be up to and including twenty of each of the switch banks or seven segment drivers. In addition, it is not necessary that the present invention include the same number of seven segment drivers as the number of switch banks. For instance, if there are more switch banks than display devices, additional output lines PA can be used to select only a switch bank.

While this invention has been described in conjunction with a specific embodiment thereof, in an electrostatographic reproduction environment, it is evident that many alternatives, modifications, and variations will be apparent to those skilled in the art. For instance, the present invention is not limited to the embodiment shown but is applicable to any device or machine which displays visual information in response to an input from a user through a push button or a key pad or the like. For instance, printers and/or copiers which use either xerographic engines or ink jet printheads are included within the scope of the invention. Accordingly, it is intended to embrace all such alternatives, modifications and variations that fall within the spirit and broad scope of the attached claims.

What is claimed is:

1. An electrostatographic reproduction machine comprising:
    (a) image bearing member;
    (b) imaging means for forming a toner image on said image bearing member;
    (c) transfer means for transferring the toner image onto a copy sheet of paper;
    (d) a user interface including a bank of switches for receiving user selection input information, and a display device for displaying a machine state responsive to the user selection input information; and
    (e) a reduced pin count controller, including a common output pin connected to said bank of switches and to said display device, for multiplexing and simultaneously (i) scanning said bank of switches and (ii) driving said display device.

2. The electrostatographic reproduction machine of claim 1, wherein said user interface includes a plurality of said bank of switches and a plurality of said display devices.

3. The electrostatographic reproduction machine of claim 1, wherein said reduced pin count controller includes a drive circuit for driving said display device and a scanning circuit, coupled to said driving circuit, for scanning said bank of switches.

4. The electrostatographic reproduction machine of claim 3, wherein said drive circuit, and said scanning circuit, are coupled to said common output pin.

5. The electrostatographic reproduction machine of claim 1, wherein said reduced pin count controller includes a first output pin connected to said bank of switches, and said common output pin connected to said bank of switches and to said display device.

* * * * *